United States Patent
Garcarz et al.

(10) Patent No.: US 12,531,775 B2
(45) Date of Patent: Jan. 20, 2026

(54) ROOT CAUSING NETWORK ISSUES USING CHAOS ENGINEERING

(71) Applicant: Cisco Technology, Inc., San Jose, CA (US)

(72) Inventors: Michal Wladyslaw Garcarz, Cracow (PL); Eduard Schornig, Haarlem (NL); Jean-Philippe Vasseur, Combloux (FR); Pierre-André Savalle, Rueil-Malmaison (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/197,426

(22) Filed: May 15, 2023

(65) Prior Publication Data
US 2024/0388496 A1    Nov. 21, 2024

(51) Int. Cl.
| | |
|---|---|
| *G06F 9/445* | (2018.01) |
| *G06F 9/38* | (2018.01) |
| *G06F 9/50* | (2006.01) |
| *G06F 9/54* | (2006.01) |
| *G06F 16/901* | (2019.01) |
| *G06F 16/903* | (2019.01) |
| *H04L 41/0631* | (2022.01) |
| *H04L 41/12* | (2022.01) |
| *H04L 41/22* | (2022.01) |

(52) U.S. Cl.
CPC ......... *H04L 41/0645* (2013.01); *H04L 41/12* (2013.01); *H04L 41/22* (2013.01)

(58) Field of Classification Search
CPC . H04L 41/0631; H04L 41/0645; H04L 41/12; H04L 41/22; G06N 3/0418
See application file for complete search history.

(56) References Cited

U.S. PATENT DOCUMENTS

| | | | | |
|---|---|---|---|---|
| 7,761,765 B2 * | 7/2010 | Yuan | ...... | G06F 11/25 714/741 |
| 8,001,527 B1 * | 8/2011 | Qureshi | ...... | G06F 11/079 717/172 |
| 9,001,667 B1 * | 4/2015 | Khanna | ...... | H04L 41/12 370/245 |
| 9,966,991 B2 * | 5/2018 | Terry | ...... | H04J 13/0018 |
| 10,521,235 B1 * | 12/2019 | Balasubramanian | ...... | G06F 9/3838 |
| 10,616,043 B2 | 4/2020 | Wang et al. | | |
| 10,621,077 B2 * | 4/2020 | Wiener | ...... | G06F 8/71 |
| 10,630,598 B1 * | 4/2020 | Kowalski | ...... | H04L 47/70 |
| 10,924,329 B2 | 2/2021 | Embarmannar Vijayan et al. | | |
| 10,963,330 B2 * | 3/2021 | Ungar | ...... | G06F 11/0778 |

(Continued)

FOREIGN PATENT DOCUMENTS

| | | | | |
|---|---|---|---|---|
| CN | 101651563 A | * | 2/2010 | |
| CN | 115514627 A | * | 12/2022 | ........... H04L 41/065 |

*Primary Examiner* — Umar Cheema
*Assistant Examiner* — Golam Mahmud
(74) *Attorney, Agent, or Firm* — Lee & Hayes, P.C.

(57) ABSTRACT

In one embodiment, a device initiates, using a chaos engineering tool, performance of randomized actions in a network via which an online application is accessible. The device obtains telemetry data from the network. The device computes correlations between the telemetry data and the randomized actions. The device uses the correlations to determine a root cause of an event in the network with respect to the online application.

20 Claims, 9 Drawing Sheets

(56) References Cited

U.S. PATENT DOCUMENTS

| | | | | |
|---|---|---|---|---|
| 11,163,875 | B1* | 11/2021 | Roundy | G06F 21/56 |
| 11,356,324 | B2* | 6/2022 | Gefen | H04L 45/38 |
| 11,397,665 | B2* | 7/2022 | Singh | G06F 11/3698 |
| 11,405,260 | B2 | 8/2022 | A et al. | |
| 11,449,379 | B2* | 9/2022 | Gomes Pereira | G06F 11/3466 |
| 11,522,766 | B2* | 12/2022 | Boussac | H04L 41/0609 |
| 11,582,099 | B1* | 2/2023 | Qu | H04L 41/0866 |
| 11,777,831 | B2* | 10/2023 | Anderson | G06F 11/36 |
| | | | | 709/224 |
| 2009/0177692 | A1* | 7/2009 | Chagoly | G06F 11/3495 |
| 2012/0216081 | A1* | 8/2012 | Duvvoori | G06Q 10/06 |
| | | | | 714/48 |
| 2014/0337674 | A1* | 11/2014 | Ivancic | H04L 41/342 |
| | | | | 714/43 |
| 2017/0046374 | A1* | 2/2017 | Fletcher | G06Q 10/20 |
| 2018/0075175 | A1* | 3/2018 | Chang | G06F 30/20 |
| 2018/0191579 | A1* | 7/2018 | Gururao | H04L 41/5009 |
| 2019/0163546 | A1* | 5/2019 | Ungar | G06F 11/079 |
| 2020/0374199 | A1* | 11/2020 | Arrabolu | H04L 41/22 |
| 2020/0409831 | A1* | 12/2020 | Balasubramanian | |
| | | | | G06F 11/3495 |
| 2021/0152416 | A1* | 5/2021 | A | H04L 41/0631 |
| 2021/0263836 | A1* | 8/2021 | Singh | G06F 11/3698 |
| 2022/0070051 | A1 | 3/2022 | Mortensen et al. | |
| 2022/0255810 | A1 | 8/2022 | Tomkins et al. | |
| 2022/0286362 | A1* | 9/2022 | Gamliel | H04L 41/145 |
| 2022/0308972 | A1* | 9/2022 | Anand | G06Q 10/063112 |
| 2023/0037124 | A1* | 2/2023 | Mengwasser | H04W 24/06 |
| 2023/0195557 | A1* | 6/2023 | Gupta | G06F 11/0772 |
| | | | | 714/37 |
| 2024/0176726 | A1* | 5/2024 | Lemberg | G06F 11/3636 |

\* cited by examiner

ROOT CAUSING NETWORK ISSUES USING CHAOS ENGINEERING

TECHNICAL FIELD

The present disclosure relates generally to computer networks, and, more particularly, to root causing network issues using chaos engineering.

BACKGROUND

The complexity of enterprise networks has increased dramatically in recent years. Indeed, many deployments now span multiple network domains (e.g., wide area networks, campus networks, wireless networks, data centers, the cloud, etc.), operate at several layers (e.g., underlays, overlays, and application), and often require several distinct network management systems (NMS) to be employed and monitored. As a result, the amount of data such as telemetry, alarms, and events from these disparate sources can be overwhelming.

The increasing complexity of enterprise networks has also led to increasing complexity with respect to diagnosing network issues, with many networks generating tens or even hundreds of network events per minute even during normal operations. This has led many enterprises to employ whole teams of Network Operation Center (NOC) engineers to evaluate which logs or alarms may be a signal of major issues and which ones are safe to ignore. Ultimately, the speed and quality at which issues are analyzed is largely a function of the institutional expertise of the NOC team. Such expert knowledge, though, is rarely written down and in a constant state of flux as personnel join and leave the enterprise.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
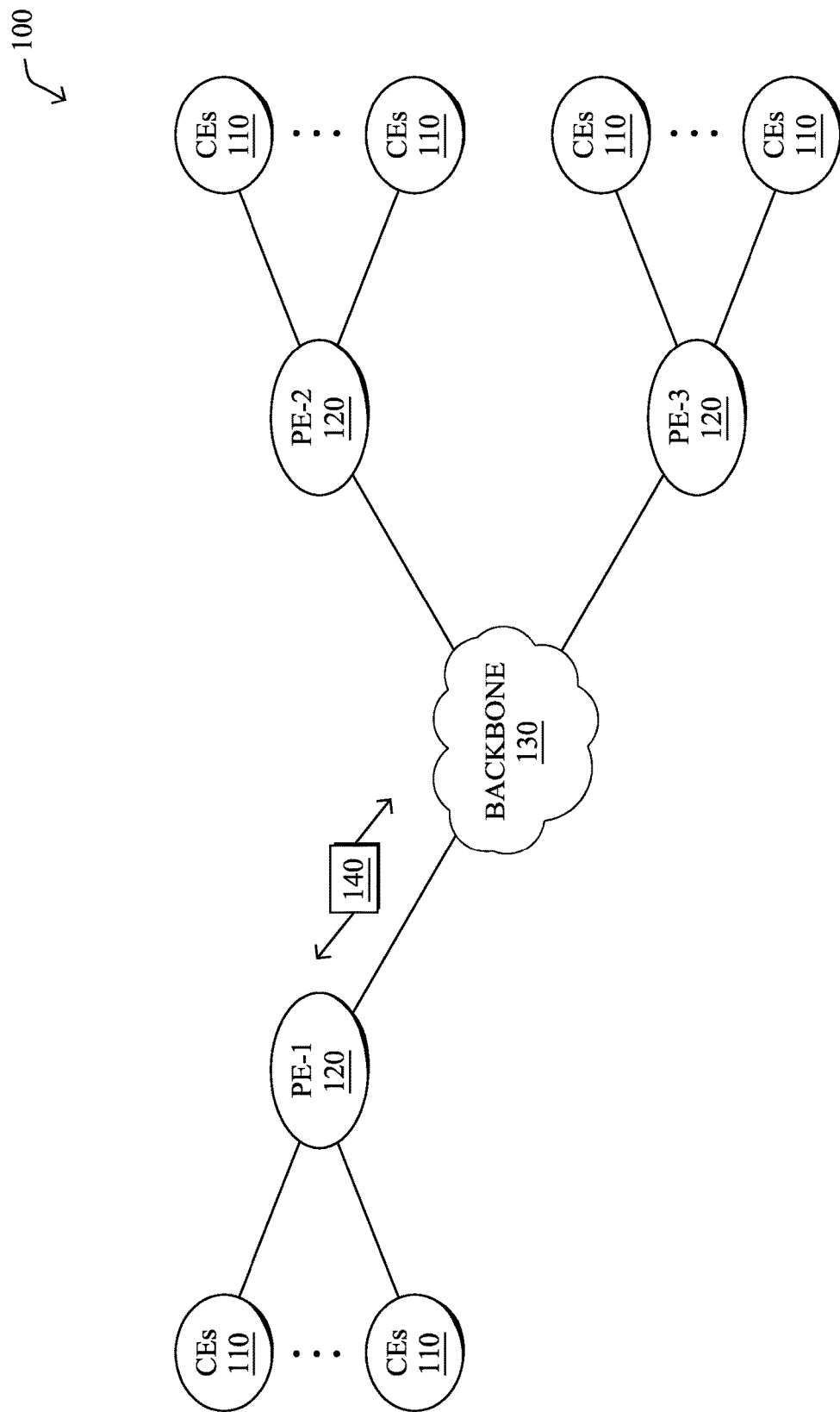
FIGS. 1A-1B illustrate an example communication network.

According to one or more embodiments of the disclosure, a device initiates, using a chaos engineering tool, performance of randomized actions in a network via which an online application is accessible. The device obtains telemetry data from the network. The device computes correlations between the telemetry data and the randomized actions. The device uses the correlations to determine a root cause of an event in the network with respect to the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
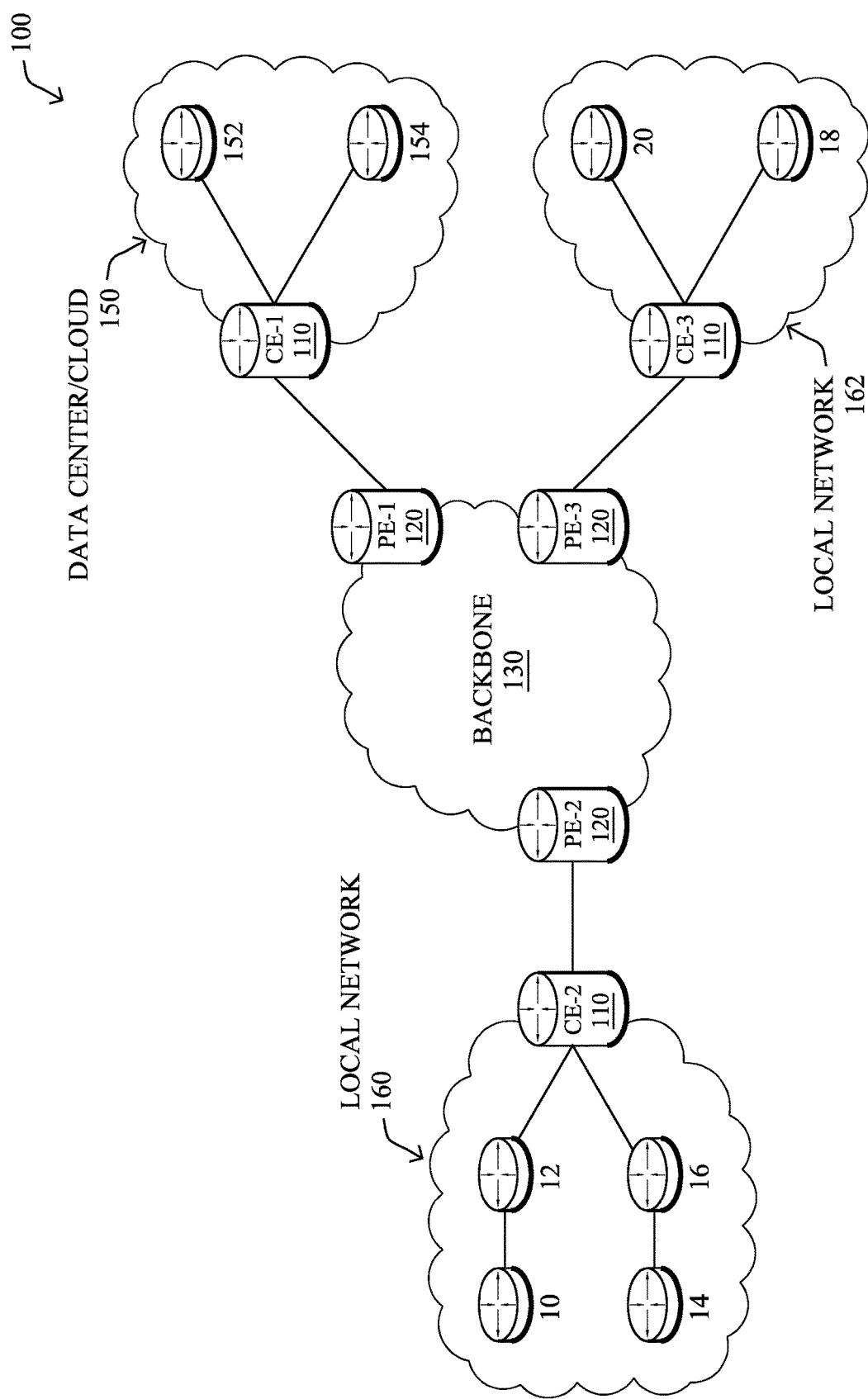

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
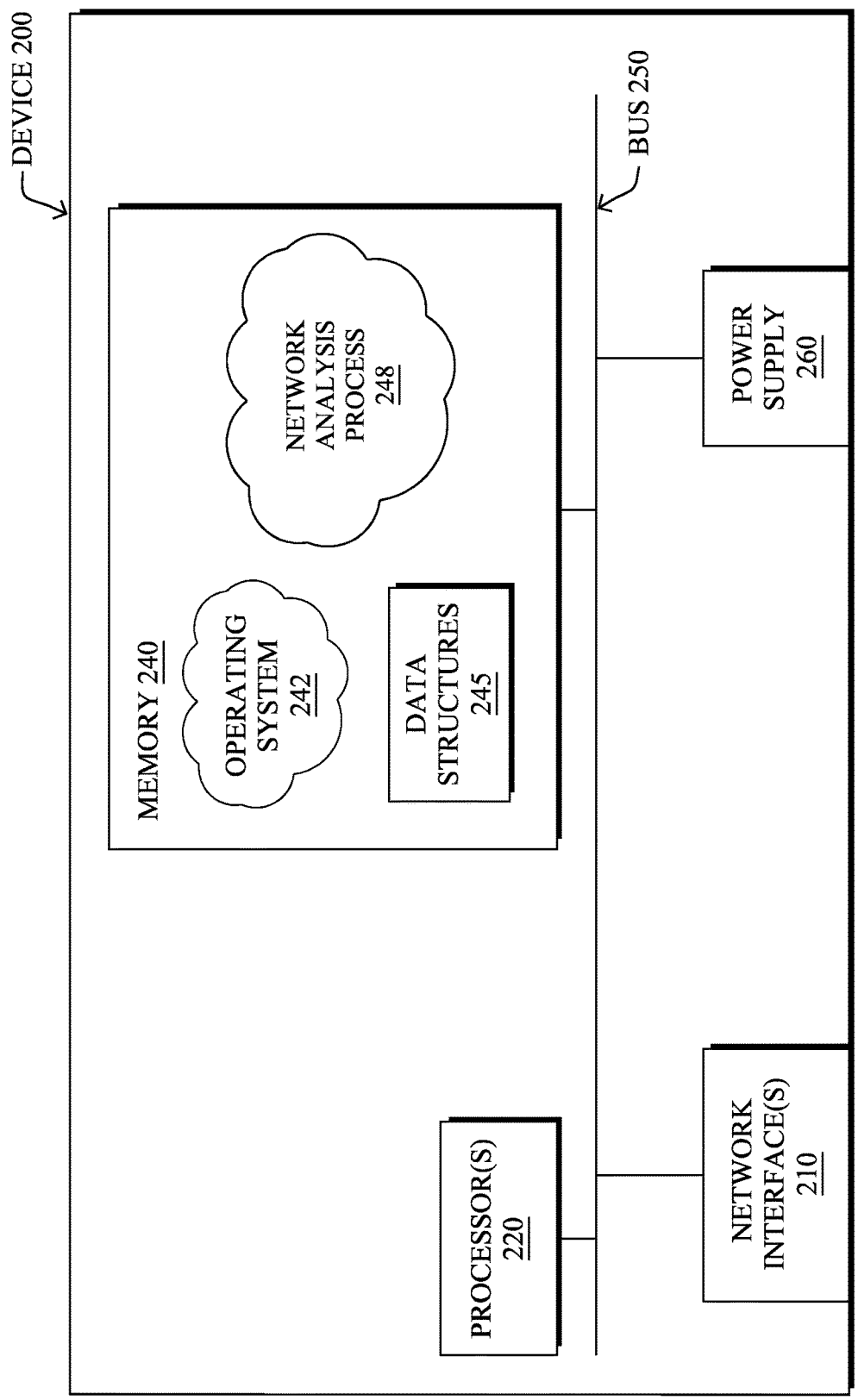
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.). portions of which are typically resident in memory 240 and executed by the processor(s), functionally organizes the node by, inter alia, invoking network operations in support of software processors and/or services executing on the device. These software processors and/or services may comprise network analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network analysis process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network analysis process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, network analysis process 248 may include computer executable instructions that, when executed by processor(s) 220, cause device 200 to perform the techniques described herein. To do so, in some embodiments, network analysis process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
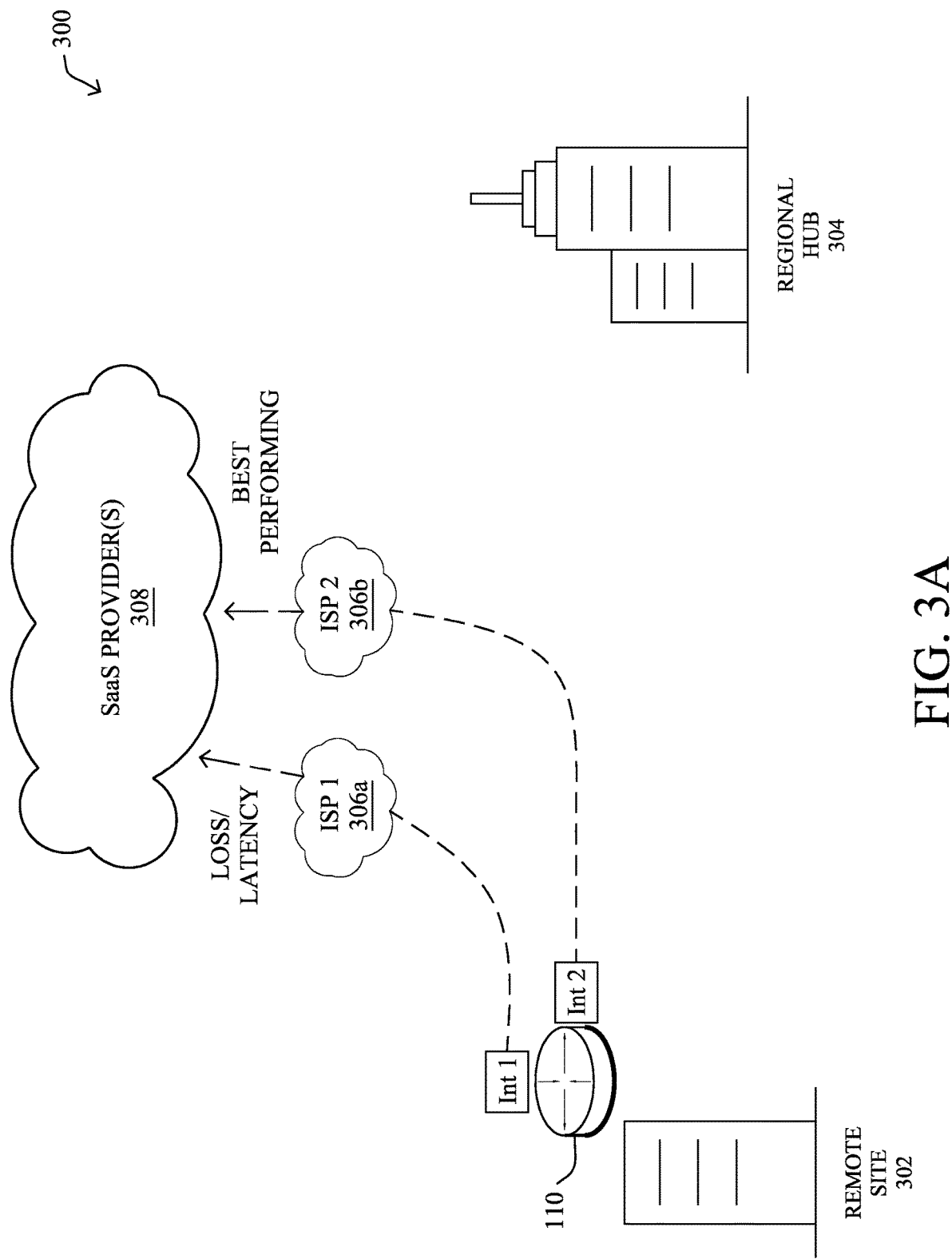
FIGS. 3A-3B illustrate example network deployments.
Figure 3B:
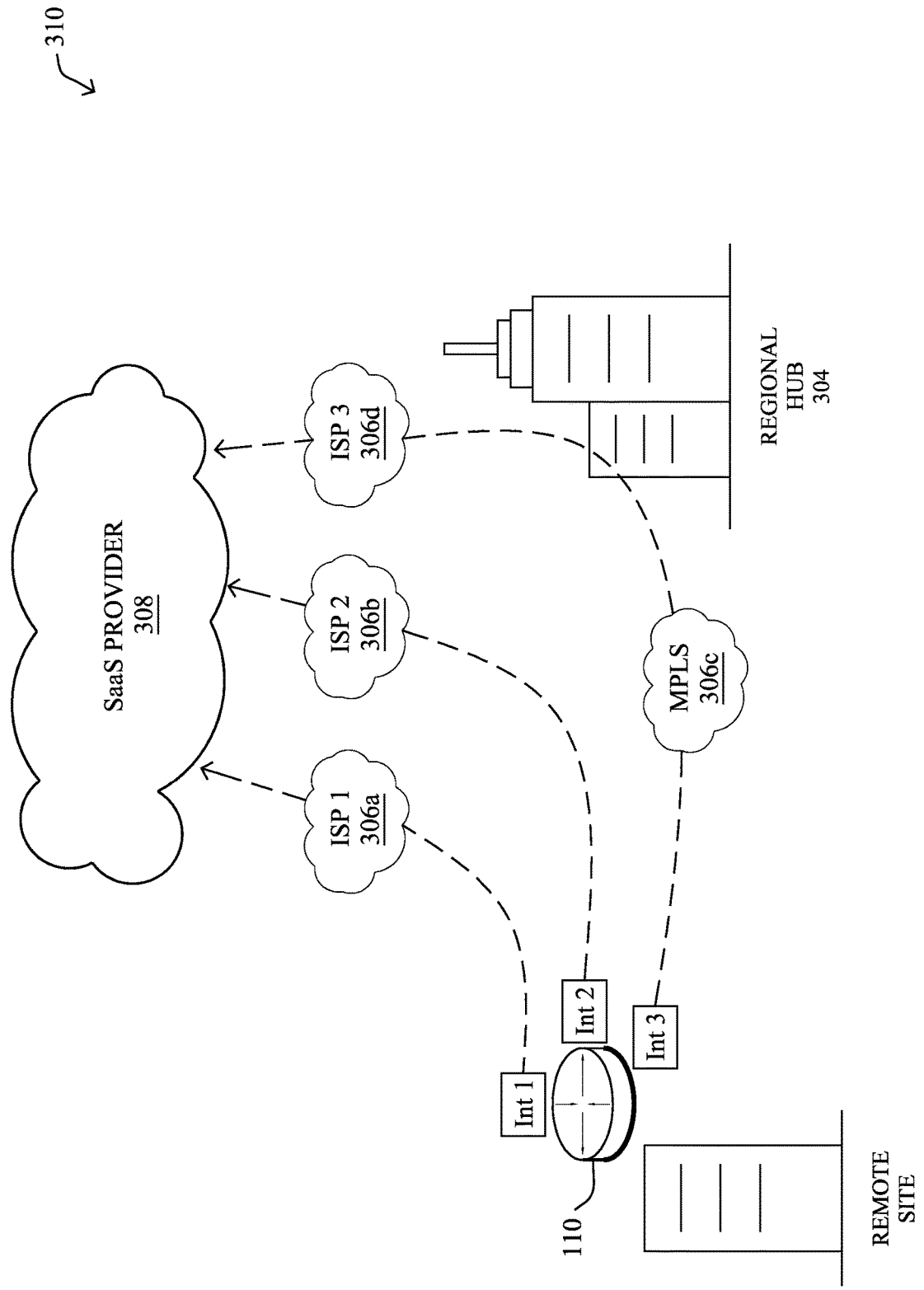

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
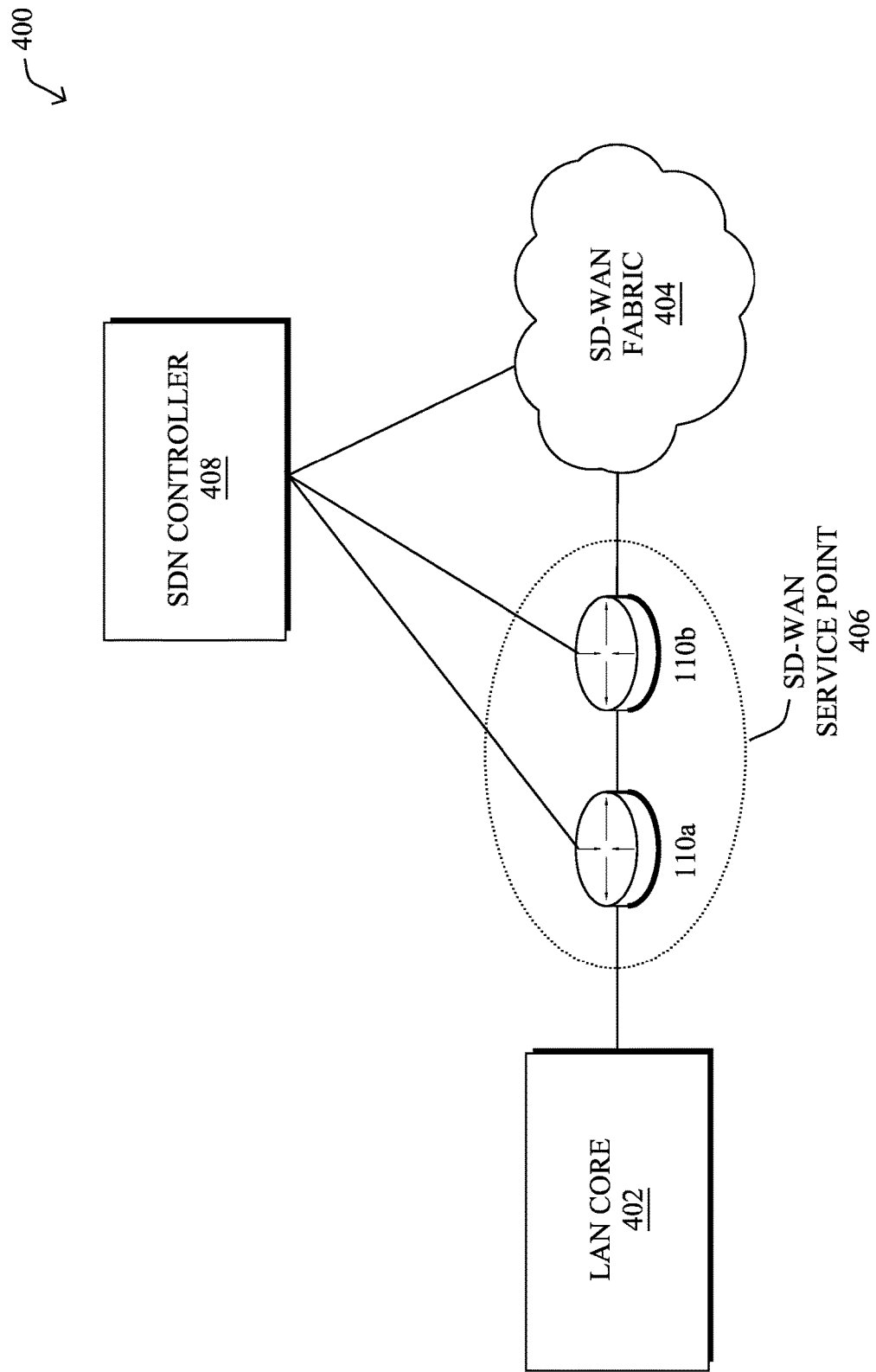
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability. often supporting a variety of Class of Service (CoS), but unfortunately without a deep understanding of the actual application requirements. On the application side. the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
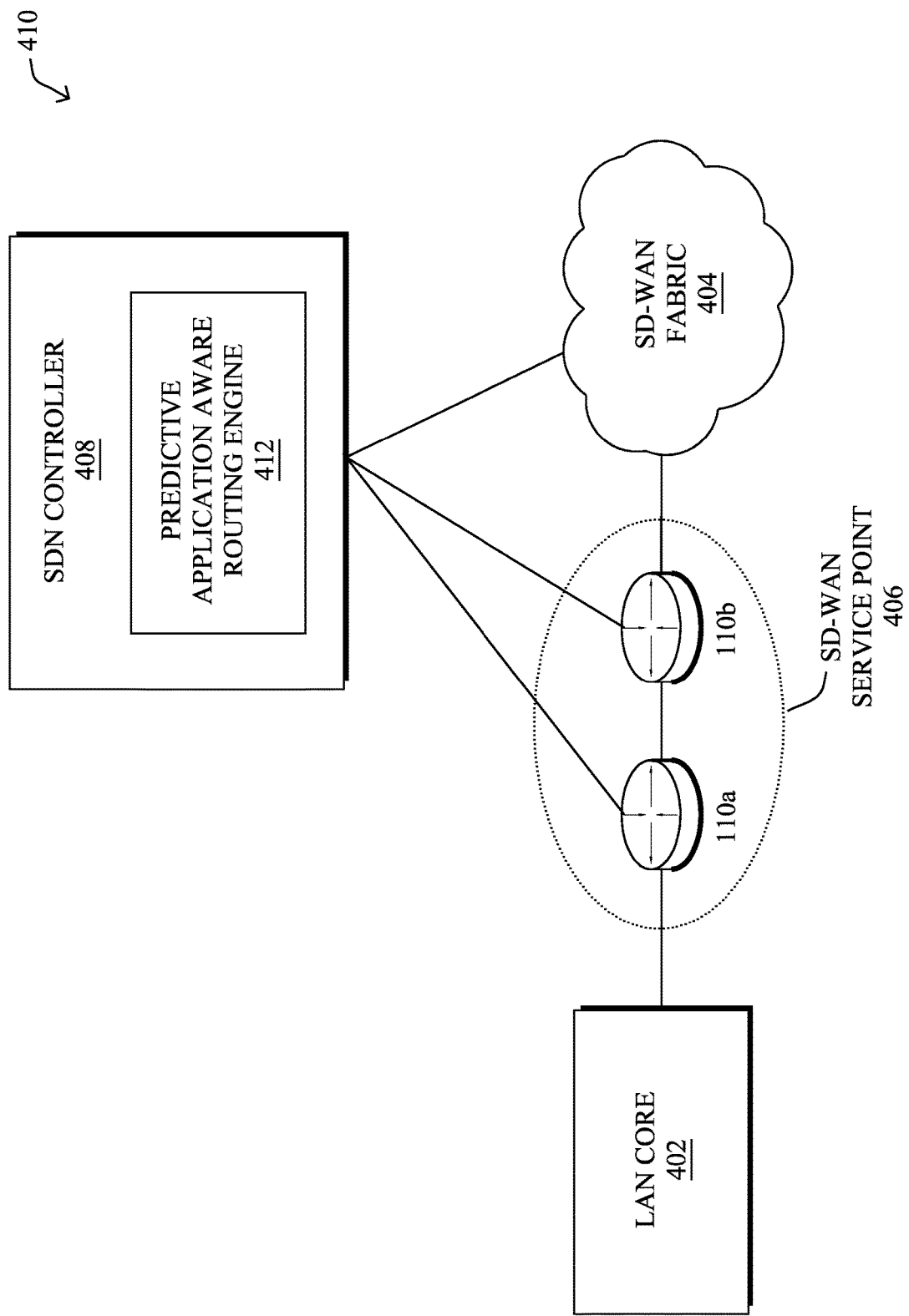

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of network analysis process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, network analysis process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, though, the complexity of enterprise networks has increased dramatically in recent years. Indeed, many deployments now span multiple network domains (e.g., wide area networks, campus networks, wireless networks, data centers, the cloud, etc.), operate at several layers (e.g., underlays, overlays, and application), and often require several distinct network management systems (NMS) to be employed and monitored. As a result, the amount of data such as telemetry, alarms, and events from these disparate sources can be overwhelming.

The increasing complexity of enterprise networks has also led to increasing complexity with respect to diagnosing network issues, with many networks generating tens or even hundreds of network events per minute even during normal operations. This has led many enterprises to employ whole teams of Network Operation Center (NOC) engineers to evaluate which logs or alarms may be a signal of major issues and which ones are safe to ignore. Ultimately, the speed and quality at which issues are analyzed is largely a function of the institutional expertise of the NOC team. Such expert knowledge, though, is rarely written down and in a constant state of flux as personnel join and leave the enterprise.

Root Causing Network Issues Using Chaos Engineering

The techniques introduced herein allow for the construction of a library of common network failures and associated failure signatures with the end goal of performing automated root causing analysis and reducing the mean time to resolution (MTTR) in enterprise networks. To this end, the proposed system leverages principles and tools native to chaos engineering, to trigger different types of failures in a network environment and then capture the associated logs, alarms, or telemetry states. In turn, the system can automatically identify subsequent, natural, occurrences of such events and determine their root causes without the need for detailed human driven troubleshooting leading to greatly reduced time to resolution.

Illustratively, the techniques described herein may be performed by hardware, software, and/or firmware, such as in network analysis process 248, which may include computer executable instructions executed by the processor 220 (or independent processor of interfaces 210) to perform functions relating to the techniques described herein.

Specifically, according to various embodiments, a device initiates, using a chaos engineering tool, performance of randomized actions in a network via which an online application is accessible. The device obtains telemetry data from the network. The device computes correlations between the telemetry data and the randomized actions. The device uses the correlations to determine a root cause of an event in the network with respect to the online application.

Figure 5:
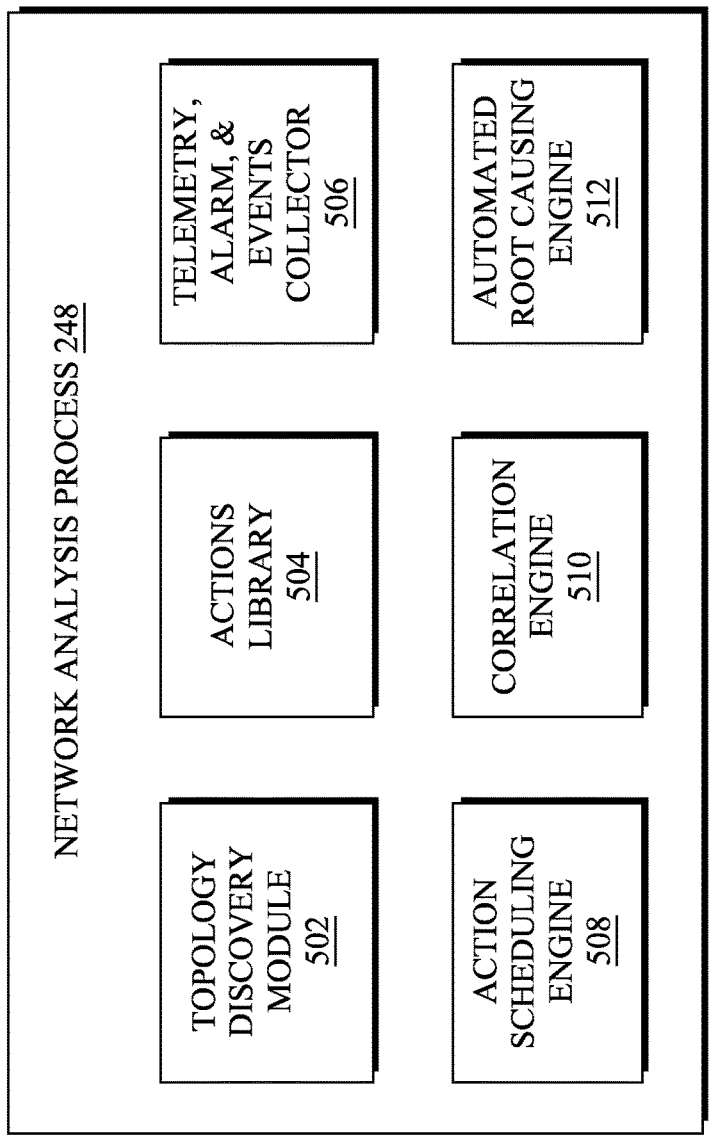
FIG. 5 illustrates an example architecture for root causing network issues using chaos engineering.

Operationally, FIG. 5 illustrates an example architecture for root causing network issues using chaos engineering, according to various embodiments. At the core of architecture 500 is network analysis process 248, which may be executed by a controller for a network, a networking device, or another device in communication therewith. For instance, network analysis process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, network analysis process 248 may be used to implement a predictive application aware routing engine, such as predictive application aware routing engine 412, or another supervisory service for the network. In further embodiments, network analysis process 248 may be used to provide a recommendation service to client devices in a network, such as client device 518.

As shown, network analysis process 248 may include any or all of the following components: topology discovery module 502, actions library 504, telemetry, alarm, and events collector 506, action scheduling engine 508, correlation engine 510, and/or automated root causing engine 512. As would be appreciated, the functionalities of these components may be combined or omitted, as desired (e.g., implemented as part of network analysis process 248). In addition, these components may be implemented on a singular device or in a distributed manner, in which case the combination of executing devices can be viewed as their own singular device for purposes of executing network analysis process 248.

During execution, network analysis process 248 may operate in conjunction with any number of telemetry collection mechanisms, to obtain various information, such as user information, application information, and/or network information. As detailed below, such telemetry collection mechanisms may include, but are not limited to, network path probing mechanisms, user account information, the QoE collection/surveying mechanisms, the online applications themselves (e.g., via application programming interfaces of the applications), network controllers (e.g., vManage, Cisco DNA Center, ACI, NSMes, etc.) and the like.

In various embodiments, topology discovery module 502 may be configured to discover all network elements (e.g., devices, users, and/or applications) in the enterprise network and construct an end-to-end network topology. To achieve its goal, topology discovery module 502 may integrate with any number of network controllers such as Cisco DNA Center, vManage ACI, etc., via a set of domain specific connectors. For example, one such connector could be used to retrieve information from Cisco DNA Center allowing for visibility into the topology of the campus and wireless networks. Another connector could be leveraged to connect to an Application Performance Monitoring (APM) solution used in the enterprise network like AppDynamics, allowing topology discovery module 502 to collect insights into the application architecture (e.g., microservices) and performance.

Topology discovery module 502 may also collect metadata for each network component, such as device model, role (e.g., network device, user device, application, sensor, etc.), software version, load etc. In turn, topology discovery module 502 may make the topology and metadata information available for consumption by the other components of network analysis process 248.

In various embodiments, actions library 504 is responsible for determining the list of actions that are supported by each discovered element. To do so, actions library 504 may start by running a clustering algorithm to group devices with similar roles together, e.g., based on the device type, and position in the topology groups such as access switches, wireless APs, SD-WAN primary or back-up routers or application servers can be created. In a second phase, actions library 504 may then associate a list of potential actions with each device group. In the case of an SD-WAN primary routers, actions library 504 may determine that actions such as rebooting the device, reducing upstream bandwidth, or shutting down specific ports are possible. In the case of an application server, however, actions such as CPU and Memory overload could be performed.

Actions library 504 may compile an action table that contains a list of available actions per group of devices along with configuration variables. For instance, Table 1 below shows a listing:

TABLE 1

| ID | Action | Device Group | Action Details | Variables |
|---|---|---|---|---|
| 1 | Interface failure | SD-WAN Router | Use feature template to bring specific interface down | DeviceName, InterfaceName |
| 2 | QoS: Shaper | SD-WAN Router | Use feature template to configure Shaper on specific interface (limit egress traffic) | RateLimitMbs, Burst |
| 3 | Introduce loss/jitter/latency | Linux | Use netem to introduce loss/jitter/latency on specific link | VMName, InterfaceName, BridgeName |
| 4 | Device failure | Access Switch | Shut down the device | DeviceName |
| 5 | Circuit breaker for external API call | Intersight Service Mesh Manager | Introduce circuit breaker pattern to block or rate limit API calls to external API | MicroserviceName, APIName, RateLimit |
| 6 | Kill microservice | AppDynamics | Kill specific microservice (or use Istio proxy policies not to send any traffic there) | MicroserviceName |
| 7 | Load DB with 1M records | Custom or AWS EC2/RDS Database | Add 1M records to specific SQL database table | DBName, TableName |
| 8 | Kill instance | AWS Instance EC2 | Stop specific EC2 instance | EC2InstanceName |
| 9 | Cpuburn to xx% CPU | AWS Instance EC2 | Consumes artificially CPU on selected EC2 instance | EC2InstanceName, CPULevel |
| 10 | Memburn to xx% Memory | AWS Instance EC2 | Consumes artificially memory on selected EC2 instance | EC2InstanceName, MemoryLevel |
| 11 | Kill Microservice | AWS Instance EKS | Stop specific K8 microservice | K8MicroserviceName |
| 12 | Disable content caching | AWS CloudFront | Disable CDN distribution for specific application | AppName |
| 13 | Remove DNS entry | AWS Route53 | Remove (or reconfigure) specific DNS record | DNSRecordName |
| 14 | Add AWS firewall entry | AWS Firewall Manager | Reconfigure policies for allowed/denied traffic | ACL policy update |

The above lists of actions contain just a few examples. In practice, this could include many more entries across variety of solutions (e.g., Hypervisors: KVM/ESX/Hyper-v, Public Cloud-all types of services, Synthetic probe solutions, APMs, Network: DC, SP, Storage: FC, RON and many more).

Telemetry, alarm, and events collector 506 has the role of collecting all the available network and application telemetry in a specific environment. To this end, the it may integrate with the various network controllers (e.g., vManage, Cisco DNA Center, ACI, other NMS systems, etc.) over a variety of different interfaces: REST APIs, SNMP, Netflow, Open Telemetry, etc.

In various embodiments, action scheduling engine 508 is responsible for executing the actions identified by actions library 504 against the live network. To do so, action scheduling engine 508 may employ different strategies to ensure robust coverage of the available actions. In one embodiment, it may select one network node and perform the same action multiple time at various time intervals, such as repeatedly disabling an upstream circuit on a specific SD-WAN router. In another embodiment, it may still choose to perform the same action multiple times, however each time on a different network device.

Where possible, action scheduling engine 508 may execute actions with the help of existing chaos engineering tools such as Chaos Monkey, Chaos Kong, or Chaos Gorilla, which facilitate interaction with cloud infrastructure and allow termination of various resources such as virtual machines (VMs), containers, availability zones, or entire cloud regions. Action scheduling engine 508 could also leverage tools such as Latency Monkey for simulating network impairments and outages. In cases where such tools are not yet available, action scheduling engine 508 may also directly interact with network controllers to perform specific actions.

Given that potentially impactful actions are executed against a live network, an important aspect to consider is when action scheduling engine 508 should execute them. In traditional Chaos Engineering. specific time windows, generically called "gamedays," are reserved for executing actions. A similar concept can be employed whereby action scheduling engine 508 periodically schedules "gamedays" (e.g., as configured by network administrators), to allow execution of actions. Additionally, for less impactful actions, action scheduling engine 508 may also take a more opportunistic approach and execute them outside of business hours or during weekends, so as to minimize the effects on user traffic.

In various embodiments, correlation engine 510 may be responsible for correlating actions, as executed by action scheduling engine 508, with outcomes in the form of telemetry collected by telemetry, alarm, and events collector 506. To achieve its goal, correlation engine 510 may compare the network and application telemetry, alarms, and events collected during the action execution instances with telemetry collected over periods of time when no action was executed. In some embodiments, correlation engine 510 may do so by using an association rule mining approach, such as the A Priori algorithm or FP-Growth.

The output of correlation engine 510 may take the form of a mapping of actions to sequences of logs and/or metric changes. For example, a WAN circuit failure may be correlated with a sequence of logs that starts with a port down notification, followed by a protocol timer expiration (OSPF session timeout), followed by several application performance metrics experiencing degradations as traffic is rerouted over alternate paths with less performance. Note that signatures may also differ, even for similar events. For instance, in the case of link failure, the logs may record a broad set of events that depend on the protocol configuration for that failed link (e.g., a link failure with BFD and OSPF will not generate the same set of logs than a link failure where BFD is not running). Said differently, the root cause may be more specific than "link failure" and may in this case be of the form of "link failure for a link where BFD and OSPF are configured."

In various embodiments, automated root causing engine 512 may be responsible for determining whether any of the known event signatures are active in the network. To do so, automated root causing engine 512 may continuously compare the data collected by telemetry, alarm, and events collector 506 against known event signatures in the signature library and compile a probability score for each signature. At any point in time, multiple signatures may match on a sequence of network logs/alarms with various degrees of confidence (probability scores) and the ones that exceed a certain probability threshold may be selected for further investigation.

Indeed, since automated root causing engine 512 is aware not only of the signature (log pattern), but also the type of event (action) that is most likely to have triggered it, it can easily confirm the root case by querying network controllers for the relevant information. For example, if a particular log pattern indicates the root cause of the issue is a SD-WAN router rebooting (or crashing), automated root causing engine 512 can query vManage for the uptime of the router to determine if indeed the router restarted. If the root cause analysis is confirmed, then automated root causing engine 512 can proceed to notify the user of an existing outage/event or directly interface with a ticketing system to log a new issue. Should the root cause analysis not be confirmed, the vManage output shows that the router did not reboot, automated root causing engine 512 may move on to investigate further actions in the list.

Figure 6:
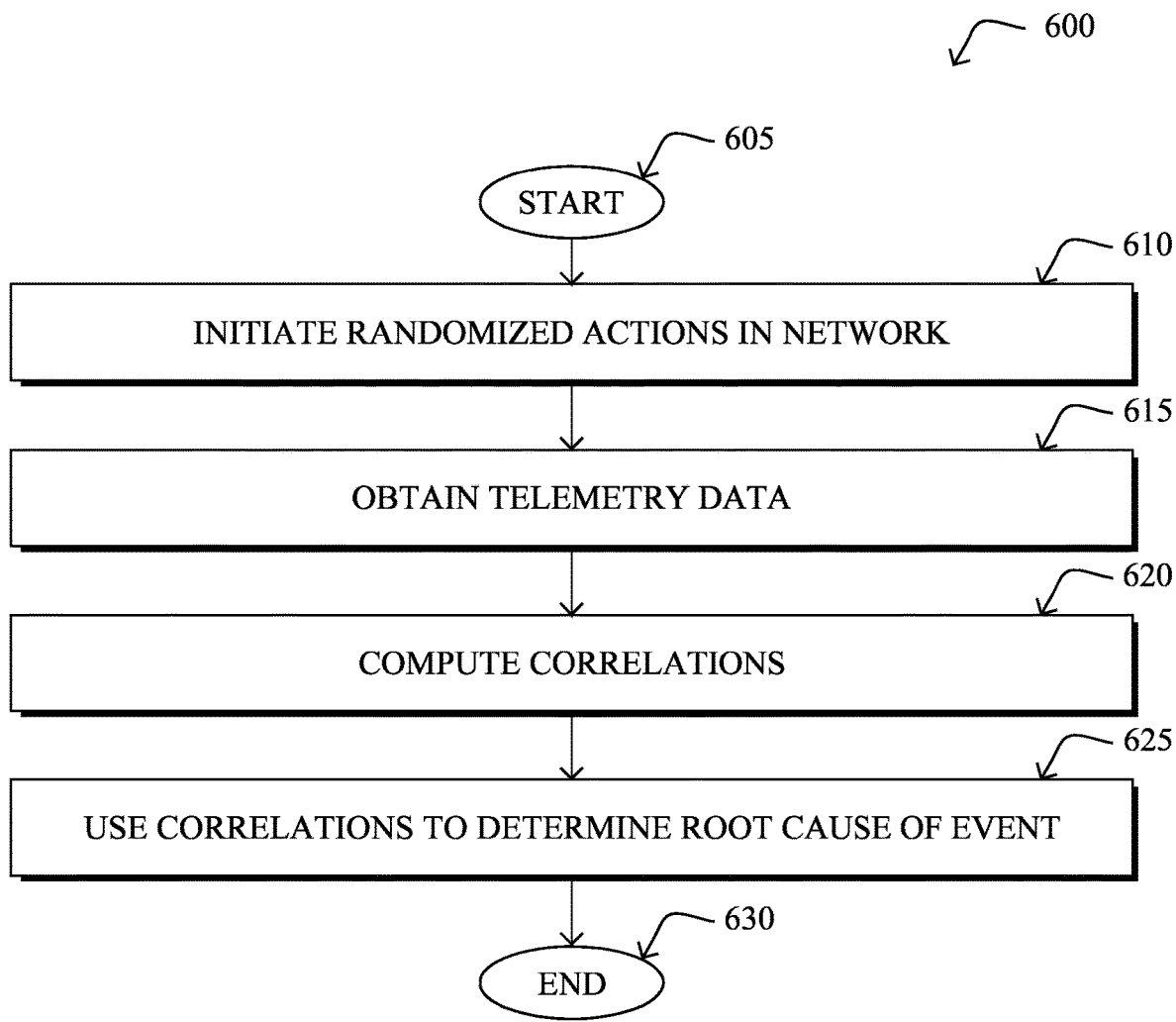
FIG. 6 illustrates an example simplified procedure for root causing network issues using chaos engineering.

FIG. 6 illustrates an example simplified procedure for root causing network issues using chaos engineering, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 600 by executing stored instructions (e.g., network analysis process 248). The procedure 600 may start at step 605, and continues to step 610, where, as described in greater detail above, the device may initiate, using a chaos engineering tool, performance of randomized actions in a network via which an online application is accessible. In some embodiments, any given action in the randomized actions is associated with a particular type of device in the network. In various embodiments, the device may also discover a topology of network elements in the network and generate, based on the topology of network elements, a set of actions from which the chaos engineering tool randomly selects to perform the randomized actions in the network. In one embodiment, the randomized actions include at least one action defined by a network administrator via a user interface. In another embodiment, the randomized actions include at least one action with respect a microservice associated with the online application. In some embodiments, the chaos engineering tool comprises one of: Chaos Monkey, Chaos Kong, Chaos Gorilla, or Latency Monkey. In one embodiment, the randomized actions are performed within a time window set by a network administrator via a user interface.

At step 615, as detailed above, the device may obtain telemetry data from the network. In some embodiments, the device obtains at least a portion of the telemetry data from a controller for the network.

At step 620, the device may compute correlations between the telemetry data and the randomized actions, as described in greater detail above.

At step 625, as detailed above, the device may use the correlations to determine a root cause of an event in the network with respect to the online application. In one embodiment, the event in the network corresponds to the online application providing poor application experience to one or more of its users. In some embodiments, the device may provide an indication of the root cause of the event for display.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for root causing network issues using chaos engineering, it is to be understood that various other adaptations and modifications may be made within the spirit and scope of the embodiments herein. For example, while certain embodiments are described herein with respect to using certain network protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   initiating, by a device and using a chaos engineering tool, performance of randomized actions in a network via which an online application is accessible, wherein the chaos engineering tool randomly selects, based on a topology of network elements in the network, the randomized actions from a set of actions that each affect network performance of the network;
   obtaining, by the device, telemetry data regarding performance of the network elements from the network;
   computing, by the device, correlations between the telemetry data and the randomized actions;
   storing, by the device, a plurality of failure signatures, each failure signature representing a correlation between a particular randomized action and a corresponding pattern of telemetry data observed during execution of that particular randomized action; and
   using, by the device and based on subsequent operation of the network, the plurality of failure signatures to determine a root cause of a natural event in the network that produced a natural pattern of telemetry data by matching the natural pattern of telemetry data to one or more corresponding stored failure signatures.

2. The method as in claim 1, wherein any given action in the randomized actions is associated with a particular type of device in the network.

3. The method as in claim 1, wherein the device obtains at least a portion of the telemetry data from a controller for the network.

4. The method as in claim 1, further comprising:
   discovering, by the device, the topology of network elements in the network; and
   generating, by the device and based on the topology of network elements, the set of actions.

5. The method as in claim 1, wherein at least one action in the randomized actions is selected from an action library that includes a definition for the at least one action that is defined by a network administrator via a user interface.

6. The method as in claim 1, wherein the randomized actions include at least one action with respect a microservice associated with the online application.

7. The method as in claim 1, wherein the chaos engineering tool comprises one of: Chaos Monkey, Chaos Kong, Chaos Gorilla, or Latency Monkey.

8. The method as in claim 1, wherein the randomized actions are performed within a time window set by a network administrator via a user interface.

9. The method as in claim 1, further comprising:
   providing, by the device, an indication of the root cause of the natural event for display.

10. An apparatus, comprising:
    one or more network interfaces;
    a processor coupled to the one or more network interfaces and configured to execute one or more processes; and
    a memory configured to store a process that is executable by the processor, the process when executed configured to:
       initiate, using a chaos engineering tool, performance of randomized actions in a network via which an online application is accessible, wherein the chaos engineering tool randomly selects, based on a topology of network elements in the network, the randomized actions from a set of actions that each affect network performance of the network;
       obtain telemetry data from the network regarding performance of the network elements;
       compute correlations between the telemetry data and the randomized actions;
       store a plurality of failure signatures, each failure signature representing a correlation between a particular randomized action and a corresponding pattern of telemetry data observed during execution of that particular randomized action; and
       use, based on subsequent operation of the network, the plurality of failure signatures to determine a root cause of a natural event in the network that that produced a natural pattern of telemetry data by matching the natural pattern of telemetry data to one or more corresponding stored failure signatures.

11. The apparatus as in claim 10, wherein any given action in the randomized actions is associated with a particular type of device in the network.

12. The apparatus as in claim 10, wherein the apparatus obtains at least a portion of the telemetry data from a controller for the network.

13. The apparatus as in claim 10, wherein the process when executed is further configured to:
    discover the topology of network elements in the network; and
    generate, based on the topology of network elements, the set of actions.

14. The apparatus as in claim 10, wherein at least one action in the randomized actions is selected from an action library that includes a definition for the at least one action that is defined by a network administrator via a user interface.

15. The apparatus as in claim 10, wherein the randomized actions include at least one action with respect a microservice associated with the online application.

16. The apparatus as in claim 10, wherein the chaos engineering tool comprises one of: Chaos Monkey, Chaos Kong, Chaos Gorilla, or Latency Monkey.

17. The apparatus as in claim 10, wherein the randomized actions are performed within a time window set by a network administrator via a user interface.

18. A tangible, non-transitory, computer-readable medium storing program instructions that cause a device to execute a process comprising:

initiating, by the device and using a chaos engineering tool, performance of randomized actions in a network via which an online application is accessible, wherein the chaos engineering tool randomly selects, based on a topology of network elements in the network, the randomized actions from a set of actions that each affect network performance of the network;

obtaining, by the device, telemetry data from the network regarding performance of the network elements;

computing, by the device, correlations between the telemetry data and the randomized actions;

storing, by the device, a plurality of failure signatures, each failure signature representing a correlation between a particular randomized action and a corresponding pattern of telemetry data observed during execution at particular randomized action; and using, by the device and based on subsequent operation of the network, the plurality of failure signatures to determine a root cause of a natural event in the network that that produced a natural pattern of telemetry data by matching the natural pattern of telemetry data to one or more corresponding stored failure signatures.

19. The method as in claim 1, wherein the natural event corresponds to the online application providing poor application experience to one or more of its users.

20. The apparatus as in claim 10, wherein the natural event corresponds to the online application providing poor application experience to one or more of its users.

\* \* \* \* \*